United States Patent [19]

Buck

[11] 3,919,661

[45] Nov. 11, 1975

[54] ELECTRONIC MONITORING SYSTEM WITH DELAYED ACTIVATION

[76] Inventor: Robert Buck, Kirchbuhlweg 128, 7995 Neukirch, Germany

[22] Filed: Nov. 13, 1974

[21] Appl. No.: 523,516

[30] Foreign Application Priority Data

Nov. 13, 1973 Germany .......................... 2356490

[52] U.S. Cl. ............ 331/65; 317/DIG. 2; 317/146; 317/148.5 R; 328/5; 331/117 R; 331/186; 340/258 C

[51] Int. Cl.$^2$ ..................... H01H 36/00; H03B 5/12

[58] Field of Search ............ 331/65, 66, 117 R, 186; 317/146, 148.5 R, 148.5 B, DIG. 2; 324/40, 41; 328/5; 340/258 C, 258 B

[56] References Cited

UNITED STATES PATENTS

| | | | |
|---|---|---|---|
| 3,459,961 | 8/1969 | Ravas | 328/5 X |
| 3,747,010 | 7/1973 | Buck | 331/65 |

*Primary Examiner*—Siegfried H. Grimm
*Attorney, Agent, or Firm*—Karl F. Ross; Herbert Dubno

[57] ABSTRACT

A contactless motion detector, comprising an output thyristor controlled by a switching network, has an oscillator coupled to the switching network via a pre-amplifier. The oscillator and the pre-amplifier are energized from a source of pulsating direct current via a supply circuit which is part of the switching network and includes a constant-current unit in parallel with the output thyristor. To prevent untimely switching of the thyristor when power is connected to the system, a delay unit retards the energization of the pre-amplifier until the oscillator has reached its operating condition. The delay unit may include one or more semiconductive devices, such as cascaded transistors or diodes, connected across a capacitor of a resistive/capacitive series circuit which bridges a smoothing capacitor inserted between a pair of bus bars.

10 Claims, 4 Drawing Figures

ELECTRONIC MONITORING SYSTEM WITH DELAYED ACTIVATION

CROSS-REFERENCE TO RELATED APPLICATIONS

This application contains subject matter disclosed in my copending applications Ser. Nos. 325,953 filed January 22, 1973 and now abandoned, 478,682 filed June 12, 1974, and 482,478 filed June 24, 1974.

FIELD OF THE INVENTION

My present invention relates to an electronic monitoring system, e.g. as used in a proximity sensor, incorporating a preferably contactless detector sensitive to an ambient condition for generating an output signal which varies with a change in that condition, e.g. with the approach of a metallic element.

BACKGROUND OF THE INVENTION

In my copending applications identified above, as well as in my prior U.S. Pat. Nos. 3,747,010, 3,747,011 and 3,747,012, I have disclosed a system of this type wherein a contactless motion detector includes a sensing stage, specifically an oscillator, and an amplifier connected to a load via a two-wire circuit which serves both for the actuation of the load and for the energization of the oscillator and amplifier. An electronic switch in the form of an output thyristor, triggerable by a detector-controlled switching transistor, is connected across all or part of a voltage-generating network that includes an electronic breakdown device, specifically a Zener diode, in series with a high-ohmic resistor which is short-circuited upon the firing of the thyristor (either in the absence or in the presence of the object whose approach is to be monitored), the voltage drop across the Zener diode insuring the availability of a sufficient operating voltage for the detector in either state of conductivity of the thyristor. My copending applications also teach the inclusion in the voltage-generating network of a storage capacitor connected in parallel with the breakdown device and separated therefrom by a decoupling diode, this capacitor serving to smooth the ripples of the raw-rectified supply voltage which insures prompt cutoff of the thyristor upon de-energization of its gate.

As particularly disclosed in my copending applications Ser. Nos. 478,682 and 482,478, the output thyristor may be shunted by a constant-current unit maintaining the necessary voltage drop across the breakdown device under all operating conditions, i.e. regardless of changes in the conductivity of the thyristor. This insures a continuity of the voltage supply for the active components of the system, in particular for the oscillator and the associated amplifier as well as a switching transistor controlling the thyristor.

In principle, the connections between the switching transistor and the thyristor may be alternately chosen in such a way that the thyristor fires when the switching transistor is either cut off or rendered conductive. The latter solution, realized for example by connecting the collector of the transistor through a resistance to the cathode of the thyristor, requires the amplifier stage of the detector to act as a signal inverter if it is desired that a reduction of the oscillator amplitude increases the output signal of the detector to a value sufficient to trigger the thyristor into conduction. Such an arrangement has the advantage that a short circuit in the amplifier stage will also manifest itself in a firing of the thyristor.

In such a system it may happen that the amplifier stage of the detector becomes operative before the oscillator or equivalent sensing means when power is first connected to the system, thereby establishing a condition which simulates the deactivation of the sensor by the occurrence of the monitored event. In the systems of my prior applications this risk is reduced by the presence of the aforementioned storage capacitor which on standstill discharges through the reverse resistances of the Zener diode and the associated decoupling diode, thereby effectively grounding the gate of the thyristor. Still, under certain conditions (e.g. on connecting the system to its current source through a mechanical switch with chattering contacts), the capacitor may charge before the oscillator reaches its fully operative condition, thereby causing untimely firing of the thyristor.

OBJECTS OF THE INVENTION

The general object of my present invention, therefore is to provide means in a monitoring system of the class referred to for preventing premature switchover of a thyristor or equivalent bistable device upon beginning energization of an associated detector.

A more particular object is to provide means for preventing the operation of an amplifier stage of such a detector before the associated sensing stage is fully operative.

SUMMARY OF THE INVENTION

I realize these objects, pursuant to my present invention, by the provision of delay means inserted between the pre-amplifier and a conductor serving for the energization thereof, the delay means retarding the operation of the amplifier upon activation of the supply circuit until the associated sensing stage has reached an operative condition.

Advantageously, the amplifier stage is of the aforementioned inverting type so as to convert the normal operating amplitude of an oscillator, constituting the associated sensing stage, into a normally small output signal which increases upon a diminution of that amplitude due to the development of a condition to be detected, such as the approach of a metallic object. Since an inoperative amplifier has no output, this arrangement positively prevents the appearance of a trigger signal during incipient energization.

The delay means may simply comprise a resistance/-capacitance circuit bridged across the storage capacitor between the two bus bars serving to energize the oscillator, the capacitive branch of that circuit lying between the base and the emitter of a transistor forming part of the amplifier. For a greater safety margin, however, I prefer to connect one or more semiconductive devices across that capacitive branch, namely diodes (advantageously including a Zener) and/or transistors. A particularly effective arrangement comprises a plurality of cascaded transistors connected in a Darlington chain and a complementary transistor coupled to the last transistor of the chain.

BRIEF DESCRIPTION OF THE DRAWING

The above and other features of my invention will now be described in detail with reference to the accompanying drawing in which.

SPECIFIC DESCRIPTION

Figure 1:
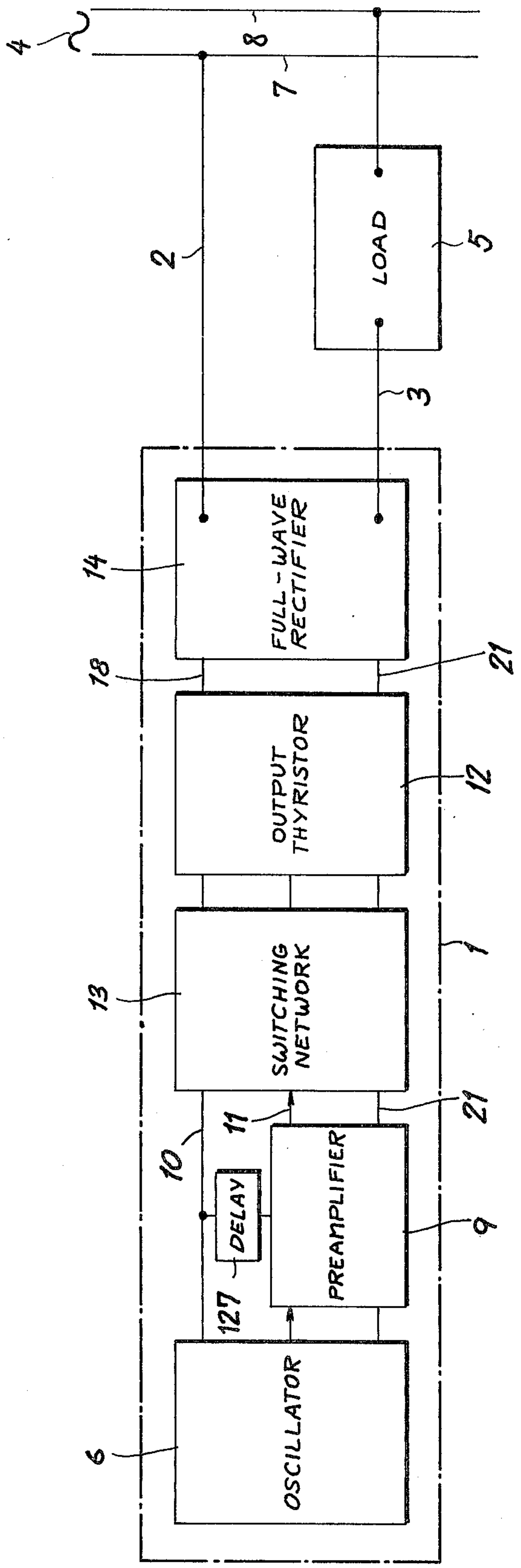
FIG. 1 is a block diagram of an electric monitoring system embodying my invention.

FIG. 1 shows the basic components of a monitoring system according to my invention, namely an oscillator 6 and a preamplifier 9 together constituting a detector, a current-responsive load 5 such as a relay in a supply circuit whose two conductors 2, 3 are connected via respective bus bars 7, 8 across an a-c source 4, a full-wave rectifier 14 inserted between the supply conductors 2, 3 and a pair of leads 18, 21 extending to an output thyristor 12 whose impedance controls the load current in response to signals from oscillator 6, and a switching network 13 also receiving the output of rectifier 14 by way of leads 18 and 21. Network 13 is connected to amplifier 9 and oscillator 6 by leads 10, 11 and 21 which serve on the one hand to control a switching transistor 20 (FIG. 2) within that network and on the other hand to supply the detector stages 6 and 9 with operating voltage. Components 6, 9, 12, 13 and 14 form part of a proximity sensor 1 of the general type described in my prior U.S. Pat. Nos. 3,747,010, 3,747,011 and 3,747,012. A delay network 127, more fully described hereinafter, is inserted between lead 10 and amplifier 9.

Figures 2, 3:
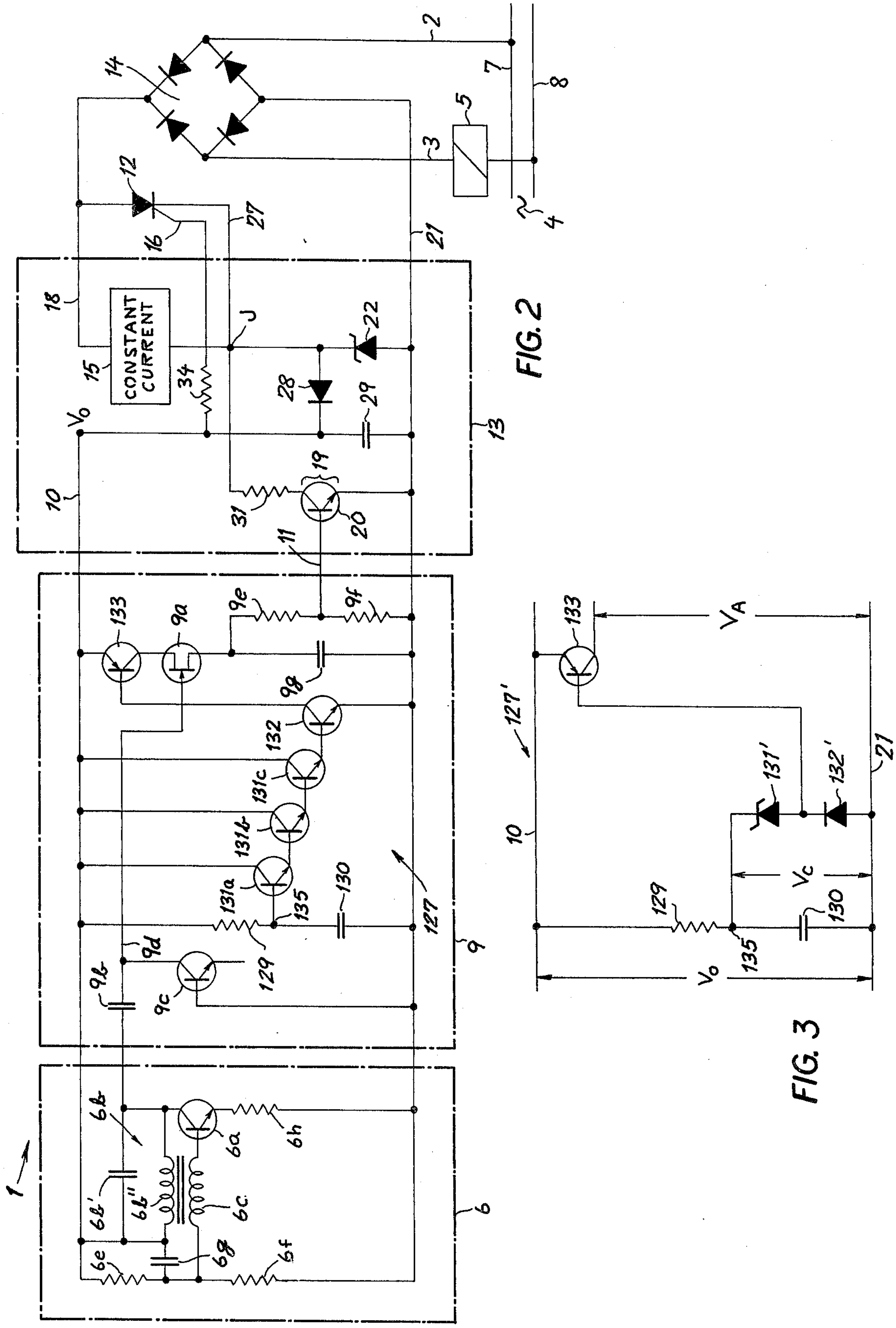
FIG. 2 is a circuit diagram of a proximity sensor similar to that shown in my copending application Ser. No. 478,682 but illustrating the present improvement.
FIG. 3 is a fragmentary circuit diagram showing a modification of the system of FIG. 2.

As shown in FIG. 2, the oscillator 6 comprises an NPN transistor **6*a* whose collector circuit includes a parallel-resonant network 6*b* consisting of a capacitor 6*b*′ and an inductor 6*b*″. A feedback inductor 6*c* is connected between the base of the transistor 6*a* and a commom terminal 6*d* of a pair of resistances 6*e*, 6*f* forming a voltage-divider network; the two coils 6*b*″, 6*c* are inductively coupled as diagrammatically indicated in the drawing. Resistance 6*e* is bridged by a shunt capacitor 6*g*. A resistance 6*h* is connected between the emitter of transistor 6*a* and a negative bus bar 21 also tied to the resistance 6*f*. This oscillator generates an output of a frequency determined by the tank circuit 6*b* and at a level depending, in a manner known per se, on the damping induced by the proximity of metal parts to the oscillator (specifically to its tank circuit 6*b*) which lowers the Q of circuit 6*b* and therefore reduces the effective collector resistance of transistor 6*a*** along with the amplification factor K so as to attenuate the oscillator output.

Component 9 is a pre-amplification stage comprising a field-effect transistor **9*a* whose gate is connected via a lead 9*d* and a coupling capacitor 9*b* to the collector of transistor 6*a*, gate lead 9*d* being biased positively by a transistor 9*c* connected as a diode to the negative bus bar 21 of the circuit. The drain of FET 9*a* is connected to lead 10 through a PNP transistor 133, forming part of delay network 127, the source of the FET being joined to bus bar 21 via an R/C network consisting of resistors 9*e* and 9*f* bridged by a storage capacitor 9*g*.**

The junction of resistors **9*e* and 9*f* is tied to the base of the aforementioned switching transistor 20 included in network 13. Transistor 20 has its emitter connected to negative bus bar 21 and has its collector connected through a resistor 31 to a cathode lead 27 of output thyristor 12 whose anode is connected to positive bus bar 18. The gate of thyristor 12 has a lead 16 connected through a resistor 34 to lead 10.**

Thyristor 12 is shunted by a constant-current unit 15 which may be constructed in the manner specifically described in my copending application Ser. No. 478,682. Unit 15 lies in series with a Zener diode 22 connected to bus bar 21, Zener 22 being connected in series with a decoupling diode 28 across a storage capacitor 29 which is inserted between bus bar 21 and lead 10. The common junction J of diodes 22 and 28 is also tied to lead 27.

Delay network 127 comprises a resistor 129 and a capacitor 130 connected in series across conductors 10 and 21. The junction 135 between resistor 129 and capacitor 130 is connected to the base of an NPN transistor **131*a* whose collector is joined to lead 10 and whose emitter is tied to the base of an NPN transistor 131*b* with similarly connected collector in cascade therewith, the latter having its emitter tied to the base of a further NPN transistor 131*c* also having its collector energized from lead 10. Transistors 131*a*, 131*b*, 131*c* form part of a Darlington chain terminating at a fourth NPN transistor 132 whose emitter is connected to negative bus bar 21 and whose collector is joined to the base of PNP transistor 133.**

When the system is fully energized, oscillator 6 operates with a large amplitude as long as there is no extraneous metallic element in its vicinity. This develops a positive biasing potential on lead **9*d* which cuts off the FET 9*a* despite the fact that PNP transistor 133 has its base negatively biased with reference to its emitter by the complementary transistor 132 which conducts along with transistors 131*a*, 131*b* and 131*c* as soon as capacitor 130 is sufficiently charged. In this condition, switching transistor 20 is also cut off so that its collector/emitter resistance 19 is high; with Zener diode 22 conducting to establish a substantially fixed potential for junction J, the current drawn by the detector 6, 9 through lead 10 and diode 28 maintains a voltage drop across resistor 34 which keeps the gate lead 16 of thyristor 12 more negative than its cathode lead 27. When the monitored metallic element approaches the oscillator 6, the generated oscillations decrease in amplitude and eventually terminate. The resulting reduction in the biasing voltage of lead 9*d* increases the conductivity of FET 9*a* and causes transistor 20 to conduct, thereby driving the cathode of thyristor 12 momentarily negative while its gate potential is clamped by capacitor 29. Thyristor 12 thereupon fires and draws additional current through bridge 14 and load circuit 2, 3 to actuate the relay 5,** thereby indicating detection of the event by a signal or a switching operation.

When power is first connected to the system by way of a-c bus bars 7 and 8, positive voltage $+V_0$ builds up only gradually on lead 10 on account of the presence of capacitor 29 and other circuit reactances. With capacitor 130 of delay network 127 initially discharged through a leakage path constituted by the bases and emitters of cascaded transistors **131*a*, 131*b*, 131*c* and 132, these transistors are at first nonconductive whereby transistor 133 is also cut off and FET 9*a* cannot conduct despite the absence of a blocking potential on lead 9*d*. The effective resistance 19 of switching transistor 20 is therefore high so that thyristor 12 cannot fire. Thereafter, as oscillator 6 begins to function, capacitor 130 charges through resistor 129 to a sufficiently positive voltage to break down the Darlington chain whereupon transistor 133** is cut in and normal operation begins.

As illustrated in FIG. 3, the cascaded transistors of FIG. 2 can be replaced by a Zener diode 131' in series with a rectifying diode 132' forming part of a modified delay network 127', the junction of diodes 131' and 132' being tied to the base of transistor 133. This delay network functions essentially in the same manner as network 127 of FIG. 2.

Figure 4:
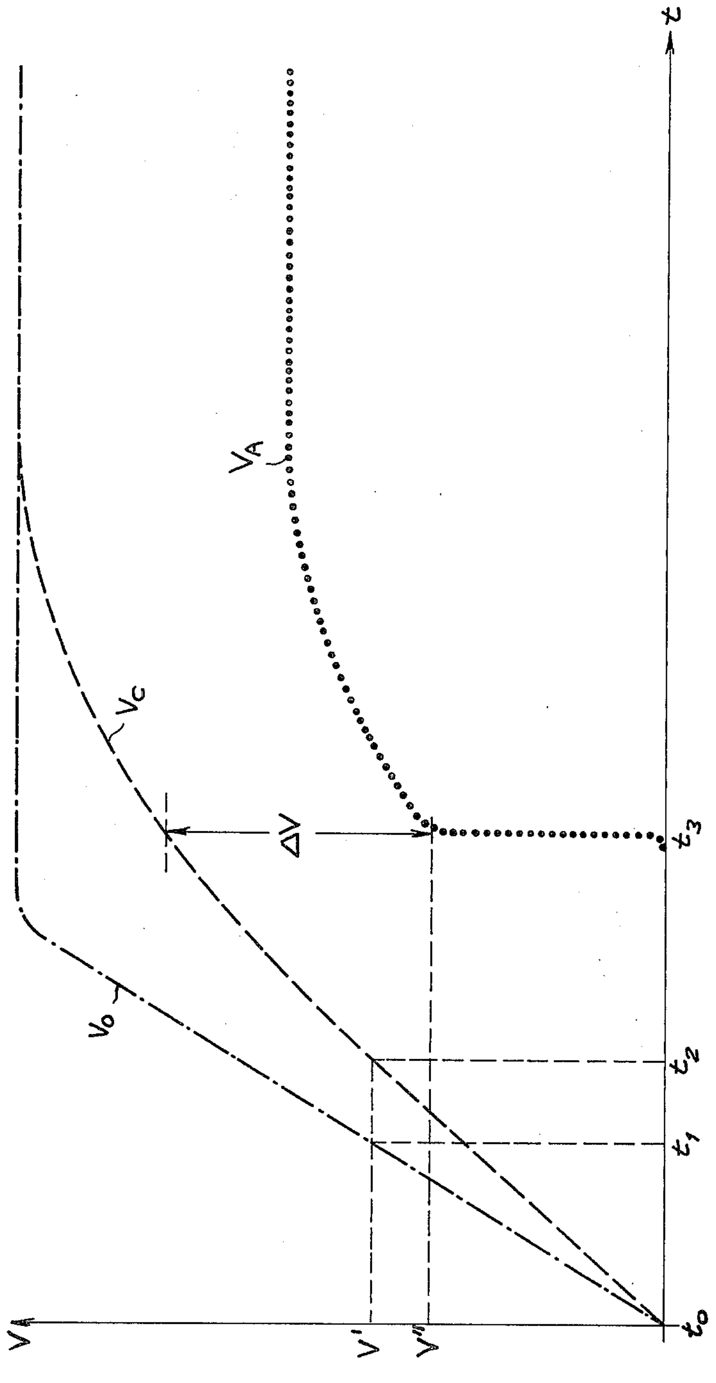
FIG. 4 is a set of graphs serving to explain the operation of my present improvement.

In FIG. 3 I have also indicated, besides supply voltage $V_O$ on lead 10, the feed voltage $V_A$ for the FET 9*a* of amplifier 9 and the voltage $V_C$ developed across capacitor 130. These voltages have also been shown in FIG. 4 over an interval beginning at a time $t_0$ of application of power to the system. Supply voltage $V_O$ rises approximately linearly to its normal level and, at a time $t_1$, reaches the value V' sufficient for the operation of oscillator 6. The voltage $V_C$ developed across capacitor 130 lags behind voltage $V_O$ and reaches the same level V' only at a time $t_2$. While this level is higher than the minimum voltage V'' that would be required for the operation of amplifier 9 if FET 9*a* were directly connected to lead 10, the presence of delay network 127 introduces a threshold voltage $\Delta V$ which allows the amplifier voltage $V_A$ to attain this level V'' only at a time $t_3$ well after supply voltage $V_O$ has stabilized.

Although my invention has been described with particular reference to an oscillator 6, it will be understood that the same is also applicable to other sensing means (e.g. a magnetic diode, a field plate, a photoresistor or the like) requiring a certain minimum voltage for their operation. Moreover, the switching network 13 may be modified in various ways including but not limited to those disclosed in my above-identified copending applications.

I claim:

1. An electronic monitoring system comprising:

detector means sensitive to an ambient condition for generating an output signal varying with a change in said condition, said detector means including a sensing stage and an amplifier stage coupled thereto;

a supply circuit including a source of direct current and a current-responsive load;

electronic switch means in circuit with said load controlled by said detector means for modifying the flow of current through said load in response to changes in said output signal;

conductor means leading from said supply circuit to said detector means for energizing same; and delay means inserted between said conductor means and said amplifier stage for retarding the operation thereof upon activation of said supply circuit until said sensing stage has reached an operative condition, thereby preventing premature actuation of said switch means.

2. A system as defined in claim 1 wherein said sensing stage comprises an oscillator with a normal operating amplitude diminishing upon the development of a condition to be detected, said amplifier stage converting said amplitude into a normally small output signal increasing upon a diminution of said amplitude.

3. A system as defined in claim 2 wherein said electronic switch means comprises a thyristor with an input circuit including a switching transistor connected to said amplifier stage for energization by said output signal.

4. A system as defined in claim 3 wherein said supply circuit includes a constant-current unit in parallel with said thyristor and a capacitor in series with said constant-current unit, said conductor means comprising a pair of bus bars connected across said capacitor.

5. A system as defined in claim 4, further comprising a Zener diode in shunt with said capacitor.

6. A system as defined in claim 1 wherein said delay means comprises a resistive/capacitive circuit and semi-conductor means connected across a capacitive branch of said circuit.

7. A system as defined in claim 6 wherein said semiconductor means comprises a Zener diode.

8. A system as defined in claim 6 wherein said semiconductor means comprises a plurality of diodes in series.

9. A system as defined in claim 6 wherein said semiconductor means comprises a plurality of cascaded transistors.

10. A system as defined in claim 9 wherein said transistors are connected in a Darlington chain, further comprising a complementary transistor coupled to the last transistor of said chain.

* * * * *